Jan. 6, 1959     D. S. CRAMPTON     2,867,464
GASKET MOUNTING
Filed April 19, 1957
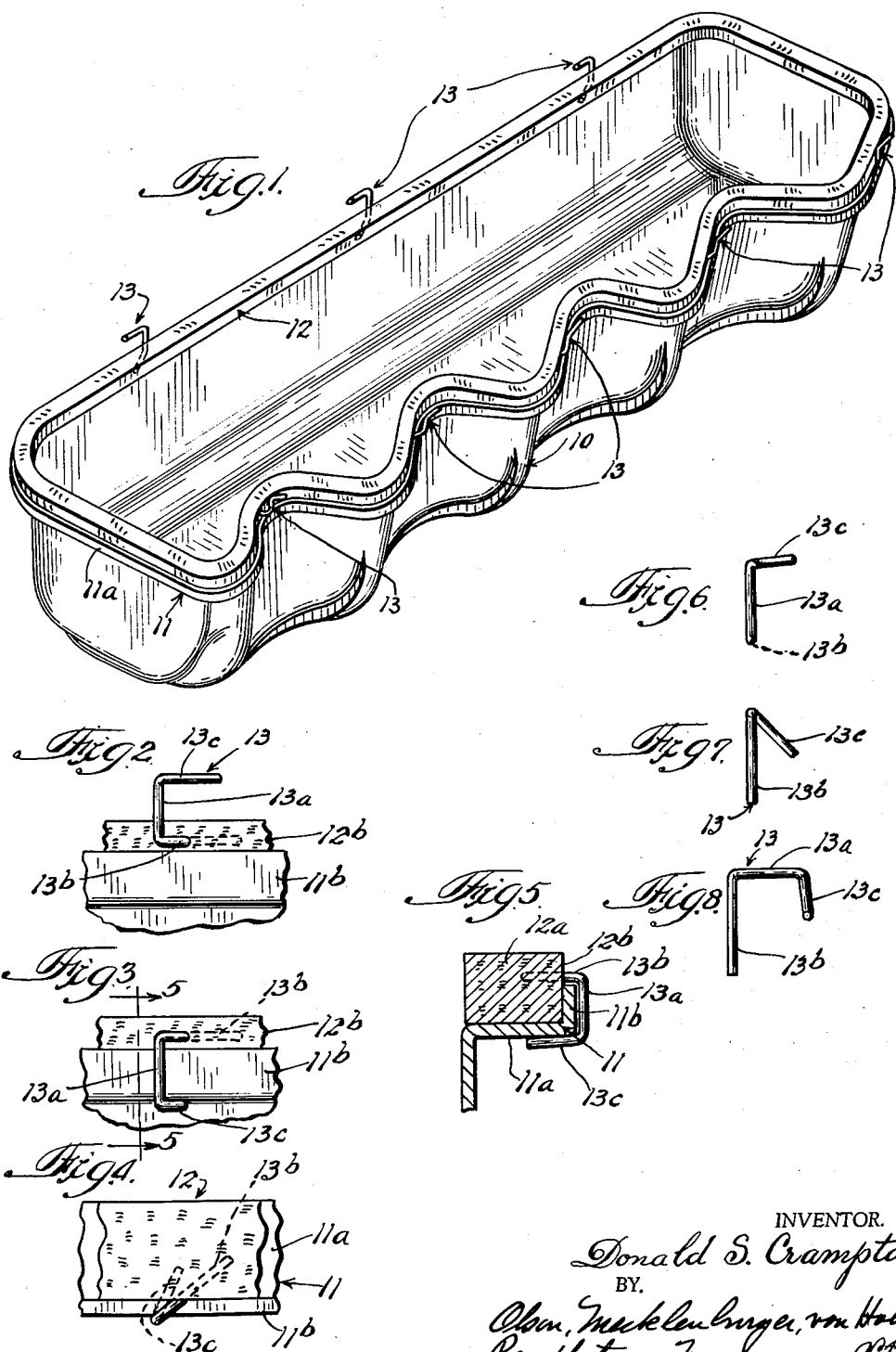
INVENTOR.
Donald S. Crampton,
BY
Olson, Mecklenburger, von Holst,
Pendleton, & Neuman. *Attys.*

United States Patent Office 2,867,464
Patented Jan. 6, 1959

2,867,464

GASKET MOUNTING

Donald S. Crampton, Grosse Pointe Farms, Mich., assignor to Felt Products Mfg. Co., Chicago, Ill., a corporation of Illinois Application April 19, 1957, Serial No. 653,812

3 Claims. (Cl. 288—22)

This invention relates to a gasket mounting and, more particularly, to a gasket mounting for cylinder head covers or the like.

In the automotive industry, for example, the mounting of gaskets on cylinder head covers prior to the assembling of the internal combustion engines has always presented problems because of either the awkwardness and time involved in mounting such gaskets, or the ineffectiveness of such mounting to retain the gasket in position during subsequent handling of the cylinder head cover.

Various mountings have heretofore been employed in an effort to overcome this problem but, because of numerous shortcomings, have been successful to only a limited degree. One such prior mounting utilizes a liquid adhesive which is applied to a surface of the gasket prior to assembly of the gasket on the supporting surface of the cylinder head cover. This mounting is undesirable because of the delay and awkwardness experienced in handling the coated gasket and the care required in applying the adhesive to the gasket. A second form of prior mounting necessitates the supporting surface of the cylinder head cover to be perforated or slotted so as to accommodate subsequently applied retaining pins. This latter mounting is undesirable because of increased cylinder head cover die costs occasioned by reason of such perforations and slots and the weakening of the gasket-contacting surface adjacent said perforations and slots, thereby rendering the cylinder head cover and/or gasket more susceptible to failure.

Thus, it is one of the objects of this invention to provide a gasket mounting which overcomes the aforementioned difficulties.

It is a further object of this invention to provide a gasket mounting which has no deleterious effect on either the gasket or the supporting surface on which it is mounted.

It is a still further object of this invention to provide a gasket mounting which is adapted to be used with gaskets and supports which vary widely in size and shape.

It is a still further object of this invention to provide a gasket mounting which is simple in construction, effective in operation, and inexpensive to produce.

Further and additional objects will appear from the description, accompanying drawings and appended claims.

In accordance with one embodiment of this invention, a gasket mounting is provided which comprises a gasket, a supporting surface having a predetermined portion thereof delimited and engaged by said gasket, and means cooperating with said gasket and supporting surface for retaining the former in position on the latter. The means includes a substantially U-shaped bent wire element wherein the legs of said element are in askewed relation with respect to one another. One leg of the element is adapted to be inserted into a surface of the gasket, which is angularly disposed with respect to the surface thereof in contact with the support. Subsequent to the insertion of the one leg of the element into the gasket, the element is pivoted about said one leg as an axis until the other or free leg thereof slidably engages the underside of the supporting surface contacted by the gasket, and thereby effects gripping of the supporting surface between the free leg and the gasket.

For a more complete understanding of this invention, reference should be made to the drawing, wherein:

Figure 1 is a perspective view of a cylinder head cover, showing the improved gasket mounting positioned thereon, but prior to the retaining elements being pivoted into operative engagement with a portion of the clinder head cover.

Fig. 2 is a fragmentary enlarged side elevational view of the cylinder head cover and improved gasket mounting shown in Fig. 1.

Fig. 3 is similar to Fig. 2, but showing the retaining elements disposed in operative engagement with the cylinder head cover.

Fig. 4 is a top plan view of Fig. 3.

Fig. 5 is a sectional view, taken along line 5—5 of Fig. 3.

Figs. 6, 7 and 8 are top, side and front views, respectively, of one of the retaining elements.

Referring now to the drawings and, more particularly, to Fig. 1, a cylinder head cover 10 is shown in an inverted position with the open side thereof facing upwardly. Delimiting the open side of cover 10 is a shoulder 11, on which is positioned the improved gasket mounting 12.

The cylinder head cover 10, shown in this instance, is of a type adapted for use in an internal combustion engine. The shoulder 11 comprises an outwardly extending ledge portion 11a and an upwardly extending outer flange or lip portion 11b, shown more clearly in Fig. 5.

Gasket mounting 12 comprises a gasket 12a which is of one-piece construction and is disposed in substantially coincident relation on ledge portion 11a of shoulder 11. The outer surface 12b of the gasket is adapted to engage the upturned flange portion 11b of the shoulder 11 and thus the gasket is restrained from bulging outwardly when the head cover 10 is drawn up tight on the engine block (not shown). The gasket is formed of a suitable resilient material, such as cork or the like.

Disposed in relatively spaced relation with respect to one another about the peripheral surface 12b of gasket 12a are a plurality of bent wire clips 13, which are adapted to cooperate with the shoulder 11 to retain the gasket and cylinder head cover 10 in assembled relation. In the instance shown in Fig. 1, the clips 13 are disposed only along the elongated sides of the gasket 12a; however, it is to be understood, of course, that a greater or lesser number of clips may be used, if desired, for securing the gasket to the cylinder head cover. Each clip 13 is of the same construction and is of substantially U-shaped configuration. Extending at substantially right angles from opposite ends of the bight portion 13a of clip 13 are leg portions 13b and 13c. The legs 13b and 13c are in substantially askewed relation with respect to one another and, as shown, leg 13b is the longer of the two. The longer leg 13b is adapted to be inserted into the portion of gasket surface 12b, above the upper edge of flange 11b, at an angle such that when the clip is in its fully released or inoperative position, as shown in Fig. 2, leg 13c will be disposed in substantially parallel relation with respect to surface 12a. Subsequent to the leg 13b being embedded in gasket 12, the clip is then rotated about leg 13b as an axis until leg 13c is brought into slidable engagement with the underside of ledge portion 11a of shoulder 11 (see Figs. 3 and 5). The bight portion 13a of the element should be of greater length than the height of shoulder flange 11b.

Thus, in applying the gasket to the open side of cylinder head cover 10, the installer initially positions the gasket in coincident relation on the ledge 11a of shoulder 11 and then manually rotates the clips about their embedded legs as axes until the exposed legs engage the underside of shoulder ledge portion 11a, whereupon the gasket and cylinder head cover are retained in assembled relation. If desired, the clips may be inserted into gasket surface 12a subsequent to the disposition of the gasket on the cover or, in instances where the installer is familiar with the cover and gasket design, the clips may be inserted in the gasket surface prior to disposition of the gasket on the cover. The number and size of the clips utilized in the gasket mounting may be varied without departing from the scope of this invention.

Thus, it will be seen that a gasket mounting has been provided which does not deleteriously affect either the gasket or the surface on which it is mounted. Furthermore, the improved gasket mounting does not require any adhesive to be applied to either the gasket or supporting surface and is adapted to be used with a variety of types of gasket and cylinder head cover constructtions.

While a particular embodiment of this invention is shown above, it will be understood, of course, that the invention is not to be limited thereto, since many modifications may be made and it is contemplated, therefore, by the appended claims, to cover any such modifications as fall within the true spirit and scope of this invention.

I claim:

1. A gasket mounting comprising the combination of a gasket, a support, and means extending laterally from the outer periphery of said gasket for securing the latter to an exposed surface of said support, said means including a substantially U-shaped element having the legs thereof of unequal lengths and disposed in askew relation with respect to one another, the longer of said legs being embedded in the surface of said gasket disposed substantially normal to the exposed surface of said support, said element being pivotal about said embedded leg as an axis whereby the shorter leg slidably engages the unerdside of said exposed support surface; the axis of said embedded leg being angularly disposed relative to the gasket surface penetrated by said longer leg whereby said shorter leg is disposed in substantially parallel relation with respect to said gasket surface and spaced above said exposed support surface when said element is in a predetermined position of pivotal adjustment.

2. A gasket mounting comprising the combination of a gasket, a support, and means for securing said gasket to an exposed surface of said support, the configuration of said gasket corresponding substantially to the configuration of said support surface, said means including a plurality of substantially U-shaped bent wire elements arranged in spaced relation about the periphery of said gasket, one of the legs of each element being longer than the other leg, said legs being in askew relation and disposed in substantially parallel planes, said longer leg being removably embedded in a surface of said gasket disposed substantially normal to said exposed support surface, the axis of said embedded leg being disposed substantially parallel to said exposed support surface, said element being pivotal about said embedded leg as an axis to effect slidable engagement by the shorter leg of said element with the underside of said exposed support surface, the axis of said embedded leg being angularly disposed with respect to the surface of said gasket from which said element extends whereby said shorter leg is disposed substantially parallel to said gasket surface and spaced above said exposed support surface when said element is in one position of pivotal adjustment.

3. A clip for use in mounting a gasket on a supporting surface, said device being of bent wire material and substantially U-shaped configuration, the legs of said device being in askew relation and disposed in substantially parallel planes; the length of said legs being unequal, the longer one of said legs being adapted to be embedded within the gasket whereby said device is pivotal about said embedded leg as an axis into slidable engagement with the underside of the supporting surface by the shorter leg and effecting gripping of the supporting surface between said shorter leg of said device and the gasket in which said longer leg is embedded.

References Cited in the file of this patent

UNITED STATES PATENTS

| 1,792,743 | Hume | Feb. 17, 1931 |
| 2,593,648 | Aukers et al. | Apr. 22, 1952 |

FOREIGN PATENTS

| 555,772 | Great Britain | Sept. 7, 1943 |